United States Patent [19]
Gruber et al.

[11] Patent Number: 6,027,561
[45] Date of Patent: Feb. 22, 2000

[54] CEMENT-BASED COMPOSITIONS

[75] Inventors: Karen Ann Gruber, Hamilton, N.J.; John Hen, Macon, Ga.

[73] Assignee: Engelhard Corporation, Iselin, N.J.

[21] Appl. No.: 09/290,057

[22] Filed: Apr. 12, 1999

[51] Int. Cl.⁷ .................................................. C04B 14/10
[52] U.S. Cl. .......................... 106/718; 106/486; 106/694; 106/718
[58] Field of Search .................................. 106/416, 486, 106/694, 718; 264/12

[56] References Cited

U.S. PATENT DOCUMENTS

| | | |
|---|---|---|
| 3,293,192 | 12/1966 | Maher et al. . |
| 3,374,056 | 3/1968 | Maher et al. . |
| 4,640,715 | 2/1987 | Heitzmann et al. . |
| 4,642,137 | 2/1987 | Heitzmann et al. . |
| 4,793,861 | 12/1988 | Sohm . |
| 4,842,649 | 6/1989 | Heitzmann et al. ............... 106/DIG. 1 |
| 4,946,505 | 8/1990 | Jungk . |
| 5,074,475 | 12/1991 | Suitch et al. . |
| 5,372,640 | 12/1994 | Schwarz et al. ......................... 106/705 |
| 5,378,279 | 1/1995 | Conroy ..................................... 106/724 |
| 5,531,824 | 7/1996 | Burkes et al. ............................ 106/737 |
| 5,624,489 | 4/1997 | Fu et al. ................................... 106/692 |
| 5,650,004 | 7/1997 | Yon ........................................... 106/719 |
| 5,714,002 | 2/1998 | Styron ...................................... 106/710 |
| 5,792,251 | 8/1998 | Smiley et al. ............................ 106/484 |

FOREIGN PATENT DOCUMENTS

| | | |
|---|---|---|
| 895972 | 2/1999 | European Pat. Off. . |
| 2634193 | 1/1990 | France . |
| 2661903 | 11/1991 | France . |
| 196 00 445 | 7/1997 | Germany . |
| 53-050229 | 5/1978 | Japan . |
| 404097934 | 3/1992 | Japan . |
| 07187735 | 7/1995 | Japan . |
| 08119696 | 5/1996 | Japan . |
| WO 9857905 | 12/1998 | WIPO . |

OTHER PUBLICATIONS

"Chemical Shrinkage & Autogeneous Shrinkage of Portland Cement—Metakaolin Pastes" Wild et al. Adv. Chem Res. (1998), 10 (3), 109–119 (Chem Abst. #129:220110).

"Metakaolin Additives in Autoclaved Cement Quartz Pastes" Klimesch et al. Adv Cem. Res. (1998) 10(3) 93–99 (Chem Abstract #129:220109).

"Metakaolin as a Pozzolanic Microfiller for High Performance Mortars" Curcio et al. Cem. Concrete Res. (1998), 28 (6) p 803–809. (Chem Abst. #129:152357).

"Metakaolin Additives to Autoclaved Cement Quartz Pastes" Klimesch et al. Adv. Cem. Res. (1997) 9,(36) p 157–165 (Chem Abst. #127:361886).

"Durability of Glass Fiber Reinforced Cememt Composites—Effect of Silicon Fume & Metakaolin" Marikunte et al. Adv Cem Based Mater. (1997) 5 (3/4), 100–108 (Chem Abst. #127:54690).

*Primary Examiner*—Paul Marcantoni

[57] ABSTRACT

In one embodiment, the present invention relates to a cement-based composition containing at least one cementitious material and at least one highly reactive pozzolan, wherein the highly reactive pozzolan comprises spray-dried metakaolin. In another embodiment, the present invention relates to a cement-based composition containing at least one cementitious material and at least one highly reactive pozzolan, wherein the highly reactive pozzolan is characterized as comprised of agglomerated beads of microparticles, the agglomerated beads having a median diameter of at least about 10 microns and the microparticles having a median diameter of about 5 microns or less.

22 Claims, No Drawings

10

CEMENT-BASED COMPOSITIONS

FIELD OF THE INVENTION

This invention relates to novel metakaolin containing cement-based compositions.

BACKGROUND OF THE INVENTION

The use of metakaolin in cement is known. For example, U.S. Pat. No. 4,793,861 describes a cement-based product which is reinforced with glass fibers having good resistance to alkaline environments. The product contains, for each 100 parts by weight of cement, about 10 to 40 parts by weight of metakaolin, the latter exhibiting a reactivity to the modified Chapelle test greater than 500 mg of CaO per gram of metakaolin.

U.S. Pat. No. 4,842,649 describes a blended hydraulic cement composition composed of portland cement, slag, pozzolans including metakaolin, and admixtures including potassium carbonate and water reducing compositions.

U.S. Pat. No, 4,975,396 describes a process for producing reinforced cementitious compositions in which the following constituents are mixed in the aqueous phase in the following order: about 35–55 parts by weight of water mixed with about 3–12 parts of a polymer, by weight of dry polymer; up to about 5 parts of a water-reducing auxiliary agent and/or a liquefying agent; from about 15–30 parts of metakaolin; from about 50–120 parts of silica sand; and about 100 parts of cement. Continuous mixing is maintained until a homogeneous, thixotropic paste is obtained. Then between 2 and 15% by weight of alkaline-resistant glass fibers, relative to the weight of the paste, is introduced into the paste.

U.S. Pat. No. 4,994,114 describes method for selecting a pozzolan (for example metakaolin) for incorporation into a composite material comprising cement and glass.

U.S. Pat. No. 5,167,710 describes a process for making a cement mixture containing fibers wherein a paste is formed by mixing cement and, per 100 parts by weight of cement, approximately 5 to 20 parts by weight of a first pulverized material of which the grains have an average diameter of between ⅕ and ⅒ of the average diameter of the grains of the cement and approximately 20 to 35 parts by weight of water. The paste is then mixed with reinforcing fibers. The paste may also include a second pulverized material the average grain diameter of which is between ⅕ and ⅒ of the average diameter of the first pulverized material.

U.S. Pat. No. 5,372,640 describes cement-based products reinforced with alkali-resistant glass fibers that become almost insensitive to aging when 30 to 40 parts by weight of a metakaolin composition are added for each 100 parts of cement.

U.S. Pat. No. 5,624,489 describes a conversion-preventing additive for high-alumina cement-based compositions, the additive comprising: siliceous pozzolanic powder, e.g. zeolite, granulated blast-furnace slag, fly ash, silica fume, rice hulls, metakaolin; inorganic salts containing sodium or potassium cations and sulphate, carbonate, nitrate, silicate, phosphate, chloride or bromide anions, and optionally other chemical admixtures, e.g. superplasticizers.

U.S. Pat. No. 5,626,665 describes cementitious systems comprised of gypsum, calcined clay, and clinker.

Pozzolans are finely divided materials which can react with alkali to form cementitious products. The fine particle size of pozzolans, however, can lead to an increase in water demand. In cement-based systems, the addition of extra water can reduce the performance of the system by reducing the strength and increasing the permeability of the resultant cement-based structures. The diminished strength is undesirable for several reasons. Initially, delay in early strength development results in surface cracking due to evaporation. Secondly, jobs take longer because the concrete form must remain in place substantially longer, and finishing is delayed.

The fine particle size of pozzolans can further lead to poor flowability of cement-based systems before setting. Therefore, there is still a need for improved pozzolans having lower water demand to produce a higher compressive strength while maintaining pozzolanic activity in cement-based systems. Since pozzolanic activity is associated with particle size, a material having finer particle size produces a more rapid pozzolanic reaction. As a result, most highly reactive pozzolans are, in produced form, fine powders with low bulk density. However, there is also still a need for pozzolans having improved flowability as a dry powder with a higher bulk density to reduce shipping and storage costs.

SUMMARY OF THE INVENTION

This invention relates to cement-based compositions containing a highly reactive pozzolan based upon metakaolin. The cement-based compositions have lower water demand and desirable flowability in dry form compared to conventional cement-based compositions. Resultant structures or composites made from the cement-based compositions according to the present invention have high compressive strength compared to structures made from cement-based compositions made with conventional pozzolans.

In one embodiment, the present invention relates to a cement-based composition containing at least one cementitious material and at least one highly reactive pozzolan, wherein the highly reactive pozzolan comprises spray-dried metakaolin.

In another embodiment, the present invention relates to a cement-based composition containing at least one cementitious material and at least one highly reactive pozzolan, wherein the highly reactive pozzolan is characterized as comprised of agglomerated beads of microparticles, the agglomerated beads having a median diameter of at least about 10 microns and the microparticles having a median diameter of about 5 micron or less.

In yet another embodiment, the present invention relates to a cement-based composition containing at least one cementitious material and at least one highly reactive pozzolan, wherein the highly reactive pozzolan comprises an agglomerated metakaolin and a dispersant.

DETAILED DESCRIPTION OF THE INVENTION

The cement-based compositions of this invention are intended for use in cement-based applications such as swimming pool plasters, grouts, mortars and concrete. The compositions of the present invention contain at least one cementitious material, at least one highly reactive pozzolan, and optionally at least one dispersant. The cement-based composition is the total combined dry mixture of the cementitious composition and highly reactive pozzolan materials which reacts with water to form the binder in concrete or other material. Concrete is a construction material comprised of the cement-based composition, water, optional admixtures, and aggregates.

Cementitious materials include those materials typically required to make cement. Generally speaking, cementitious materials are binder materials that harden to form a connecting medium between solids. Cementitious materials include cements, which are any mixture of finely-ground lime, alumina, and silica that will set to a hard product that combines with other ingredients to form a hydrate such as portland cement, hydraulic cements, blended cement, and masonry cement, mortar, and related aggregate, admixtures and/or additives including hydrated lime, limestone, chalk, calcareous shell, talc, slag or clay.

Ordinary portland cement is a hydraulic cement produced by pulverizing portland cement clinker. Portland cements are classified under ASTM standards© 150-95 into eight types, including: Type I for use in general concrete construction where the special properties specified for Types II, III, IV and V are not required; Type II for use in general concrete construction exposed to moderate sulphate action, or where moderate heat of hydration is required; Type III for use when high early strength is required; Type IV for use when low heat of hydration is required; Type V for use when high sulphate resistance is required; and Types IA, IIA and IIIA, which are the same as Types I, II, and III, respectively, except that they have an air entraining agent added. "Ordinary portland cement" in the context of this invention includes all types (I–V and IA–IIIA) of portland cement as referenced in ASTM C 150-95.

In one embodiment, the cement-based compositions of the present invention contain from about 50% to about 99.5% by weight of a cementitious material. In another embodiment, the cement-based compositions of the present invention contain from about 75% to about 99% by weight of a cementitious material.

The cement-based compositions contain at least one highly reactive pozzolan. The cement-based compositions according to the present invention have at least one of lower water demand, higher compressive strength, and higher flowability compared with cement-based compositions that do not contain a highly reactive pozzolan. In one embodiment, the cement-based compositions of the present invention contain from about 0.5% to about 50% by weight of a highly reactive pozzolan. In another embodiment, the cement-based compositions of the present invention contain from about 1% to about 25% by weight of a highly reactive pozzolan. In yet another embodiment, the cement-based compositions of the present invention contain from about 2% to about 20% by weight of a highly reactive pozzolan.

The highly reactive pozzolan is highly reactive in that composites having high compressive strengths are obtainable as a result of the present invention. That is, the components of the cement-based compositions of the present invention containing the highly reactive pozzolan react and set in such a manner that composites having high compressive strengths are obtained compared with cement-based compositions that do not contain the highly reactive pozzolan as described herein. Although the highly reactive pozzolan possesses little or no cementitious value, in the presence of moisture it chemically reacts with calcium hydroxide at ordinary temperatures to form compounds possessing cementitious properties.

The highly reactive pozzolan is constituted by agglomerated beads of microparticles. In one embodiment, the agglomerated beads have a median particle size from about 10 microns to about 100 microns (above about 10 microns). In another embodiment, the agglomerated beads have a median particle size from about 15 microns to about 50 microns (above about 15 microns). In yet another embodiment, the agglomerated beads have an average particle size from about 20 microns to about 40 microns (above about 20 microns).

In one embodiment, the microparticles have a median particle size from about 0.1 microns to about 5 microns (about 5 microns or less). In another embodiment, the microparticles have a median particle size from about 0.2 microns to about 2 micron (about 2 micron or less). In yet another embodiment, the microparticles have a median particle size from about 0.25 microns to about 0.75 microns (about 0.75 microns or less).

In a preferred embodiment, the particle size distribution of the microparticles is about 95% of the microparticles are from about 0.2 microns to about 5 microns. In another preferred embodiment, the particle size distribution of the agglomerated beads is about 95% of the agglomerated beads are from about 15 microns to about 30 microns. In another embodiment, the agglomerated beads of the metakaolin particles have a median particle diameter of at least five times that of the constituent metakaolin microparticles. Microparticles smaller than about 0.1 microns do not typically negatively affect the performance of the agglomerated beads, but microparticles larger than about 10 microns should be minimized as they may reduce the physical integrity of the agglomerated beads of this invention.

There are a number of methods and devices for measuring particle sizes in this range. For the purposes of this invention particle size is determined by conventional sedimentation techniques using Micromeretics, Inc.'s SEDIGRAPH® 5100 particle size analyzer. Particles are slurried in water with a dispersant and pumped through the detector with agitation to disperse loose agglomerates.

The highly reactive pozzolans suitable for use in the present invention may be prepared by a process which comprises agglomerating a liquid slurry comprising at least one metakaolin. In a preferred embodiment, the metakaolin combined with water has a particle size from about 0.1 micron to about 5 microns. The desired particle size distributions of the metakaolin can be obtained by grinding or pulverizing larger particles of metakaolin and/or through screening, centrifuging, air classification, or other separating means for removing particles larger than about 10 microns.

Metakaolin is known to those of ordinary skill in the art and can be prepared by calcining hydrous kaolin, which is generally represented by the formula $Al_2O_3 \cdot 2SiO_2 \cdot 2H_2O$, where the water is present as interstitial water. The metakaolin of this invention is typically made by calcination at temperatures from about 350° C. to about 1000° C., more typically from about 500° to about 900° C. The terms "metakaolin" and "metakaolinite" are used herein to mean an activated product of kaolinite, produced thermally or by any other means. The abbreviated formula for metakaolin can be written by using the standard symbols A and S ($A=Al_2O_3$ and $S=SiO_2$) as $AS_2$.

In one embodiment, metakaolin is combined with a liquid to form a slurry. The liquid is typically water but may also include organic liquids and water-organic liquid mixtures. Optionally, an effective amount of at least one dispersant is included in the slurry to facilitate the dispersion of the metakaolin. These dispersants may be preformed and added to the slurry or formed within the slurry.

The slurry is typically neutral, e.g., having a pH from about 6 to about 8, and preferably from about 6.5 to about 7.5. The pH of the slurry may be adjusted, if necessary, by the addition of an acid or base so that the final pH of the slurry is approximately neutral. Formation of the slurry is typically conducted at ambient temperature and at atmospheric pressure. Higher or lower temperatures and pressures may be used but are not necessary.

Dispersants suitable for use in the present invention include organic dispersants and inorganic dispersants. Dispersants generally include ammonia-based dispersants and phosphate-based dispersants. Dispersants further include sulfonate dispersants, carboxylic acid dispersants and polymeric dispersants, such as polyacrylate dispersants.

In one embodiment, from about 0.1% to about 20% by weight of the metakaolin of one or more dispersants is added to the slurry. In another embodiment, from about 0.5% to about 10% by weight of the metakaolin of one or more dispersants is added to the slurry. In yet another embodiment, from about 1% to about 8% by weight of the metakaolin of one or more dispersants is added to the slurry.

Inorganic phosphate-based dispersants include diammonium phosphate, dipotassium phosphate, disodium phosphate, monoammonium phosphate, monopotassium phosphate, monosodium phosphate, potassium tripolyphosphate, sodium acid pyrophosphate, sodium hexametaphosphate, sodium tripolyphosphate, tetrapotassium pyrophosphate, tetrasodium pyrophosphate, tripotassium phosphate, trisodium phosphate, urea phosphate and mixtures thereof.

Sulfonate dispersants include naphthalene sulfonates, alkylnaphthalene sulfonates, ethoxylated alkylphenol sulfonates, petroleum sulfonates, fatty acid sulfonates, lignosulfonates, olefin sulfonates, amine sulfonates, and alkylaryl sulfonates. Specific examples include those under the trade designation Morwet® available from Witco Corp., those under the trade designation Sellogen available from Henkel Corp., and those under the trade designation Emkapon available from Emkay Chemical Co.

Carboxylic acids include typically include organic acids and their corresponding salts containing from about 6 to about 25 carbon atoms. In another embodiment, carboxylic acids include typically include organic acids and their corresponding salts that contain from about 8 to about 20 carbon atoms.

Polyacrylates include polyacrylic acid, salts of acrylic copolymers, acrylic acid copolymers (for example with maleic acid), and ammonium or alkali metal polyacrylates and polycarboxylate salts. Specific examples include those under the trade designations Acumer® and Acusol available from Rohm & Haas Co., those under the trade designation Colloid available from Rhone-Poulenc Corp., and those under the trade designation Mayosperse available from Mayo Chemical.

In one embodiment, the cement-based compositions and/or the pozzolan composition also contain at least one of water reducers and superplasticizers. A minor amount of a flocculating agent may also be incorporated into the mixture to facilitate dispersion/suspension of the particles in the liquid medium. In addition, materials other than metakaolin may be incorporated into the mixture. For example, a minor amount of special water-soluble or water-dispersible sorbents (e.g., silicas, aluminas or other clays) to selectively adsorb sulfur, soaps, phosphorous or other deleterious compounds may be incorporated into the mixture and end up in the agglomerated beads. Additional additive materials include gypsum, alkali salts, hydrated kiln dust, hydrated lime, fly ash, plasticizing agents, etc.

In one embodiment, the cement-based compositions and/or the highly reactive pozzolans contain a binder such as carboxymethyl cellulose, polyvinyl alcohol and/or polyvinylpyrrolidone. In another embodiment, the cement-based compositions and/or the highly reactive pozzolans do not contain a binder such as carboxymethyl cellulose, polyvinyl alcohol and/or polyvinylpyrrolidone. In a preferred embodiment, the highly reactive pozzolan composition does not contain a binder such as carboxymethyl cellulose, polyvinyl alcohol and/or polyvinylpyrrolidone.

In another embodiment, the cement-based compositions and/or the highly reactive pozzolans contain a minor amount of at least one binder material, preferably a water dispersible binder. As used herein, a "water dispersible binder" shall mean that under typical process conditions, the binder is soluble in water or other liquid medium or is sufficiently dispersed or suspended therein. Binders suitable for use within the context of the present invention include alginates, dextrin, glucose, gums, starch, waxes, glues; polymeric compounds such as poly(vinylacetate); mineral acids such as sulfuric acid and phosphoric acid; phosphates such as ammonium phosphate; silica compounds such as alkaline silicates and silica hydrosol; and colloidal clays such as attapulgite. These binder materials are typically present in an amount up to about 10% by weight of the highly reactive pozzolan on a moisture-free basis, preferably from about 1% to about 5% by weight. Typically, the polymer compound, if present as the only binder, is present in an amount up to about 3% by weight of the highly reactive pozzolan on a moisture-free basis; and the colloidal clay, if present as the only binder, is present in an amount up to about 5% by weight of the highly reactive pozzolan on a moisture-free basis (as used herein in this context means the weight achieved after heating to a constant weight at about 250° F.).

The agglomeration of the metakaolin; that is the formation of the agglomerated beads can be carried out by spray drying the slurry, flash drying the slurry, rotary drying, mixing the slurry or other conglomeration techniques. Flash drying techniques are known in the clay industry. Spray drying techniques are known in the clay industry. As a reference, consult, e.g., "Atomization and Spray Drying," by W. R. Marshall (Chemical Engineering Monograph Series, No. 2, Vol. 50 (1954)), which is hereby incorporated by reference for its teachings in this regard.

In spray drying, the mixture of metakaolin, liquid (preferably water) and optional additives or ingredients is adjusted, if necessary, by the addition of liquid so that the metakaolin slurry is pumpable and sprayable. In one embodiment, the concentration of metakaolin in the slurry is at least 40% by weight of the slurry. In another embodiment, the concentration of metakaolin in the slurry is at least 50% by weight of the slurry. In yet another embodiment, the concentration of metakaolin in the slurry is at least 60% by weight of the slurry. It is noted that due to rheological considerations, smaller interactive particles tend to make a viscous mix, so transport properties depend on the size of the particles as well as their concentration.

The mixture or slurry is then sprayed into an atmosphere of hot, inert (to this product) gases.

Spray dryers of various designs can be used. These dryers may be of the concurrent, countercurrent, or mixed flow type. Nozzles, disks or the like can be used to disperse the slurry into droplets. The temperature of the inlet and outlet air of the spray dryer will depend, of course, on the design of the 10 dryer. The actual internal temperature of the agglomerated beads in the drying chamber should be below 225° F., for example from about 180° F. to 200° F. At these temperatures, there is very little or no change in the crystal structure of the clay (free water is eliminated but interstitial water is not eliminated). The droplets thus become porous agglomerated beads of metakaolin and are collected downstream of the drying chamber, by the usual methods. Using a concurrent dryer, the air inlet temperature and the clay slurry feed rate are adjusted to produce an air outlet temperature within the range from about 250° F. to about 300° F.

In another embodiment, the mixture of metakaolin, liquid (preferably water), and optional ingredients can be agglomerated in a mechanical mixer. Mixing typically involves using a high-shear mixer. A preferred type of mixer employs pins or blades mounted radially on a rotating shaft, so that the tip of the pin or blade, traveling at high speed, causes solid particles, binder and water to impinge upon or contact each other in such a way as to form an agglomerate. In time, nominally-spherical particles tend to grow larger and larger. This phenomenon is enhanced by the tips of the blades or pins coming very close to a stationary wall or to a solid object (e.g., another blade or pin) moving at a different relative rate. The vortexes set up by this shearing motion tend to enhance the sphericity of the growing beads.

Other less energy-intensive mechanical contacting processes are known to those skilled in the art, including the use of drum or dish granulators, fluidized or spouted bed granulators, or tumbling, rotary, vibratory or gyratory granulators. For descriptions of these processes, see, for example, Sherrington, P. J., *Granulation*, Heyden & Son, Ltd., (1981), which is incorporated herein by reference for its teaching in this regard. These and similar devices can be used to produce granules, although not all are optimum for making the instant invention.

The present invention provides strong, porous agglomerated beads of metakaolin in the relatively small particle size range from about 10 to about 100 microns. "Strength" can be defined by any number of attrition tests. For example, agitating the product in oil and then measuring particle size or filter rate will give a relative measure of strength. Alternatively, if the product is transported pneumatically in a loop for a period of time, this can separate strong particles from weaker formulations.

The agglomerated beads contain from about 70% to about 100% by weight of metakaolin microparticles and from about 0% to about 30% of one or more dispersants and additives. In another embodiment, the agglomerated beads contain from about 80% to about 99% by weight of metakaolin microparticles and from about 1% to about 20% of one or more dispersants and additives. In yet another embodiment, the agglomerated beads contain from about 90% to about 98% by weight of metakaolin microparticles and from about 2% to about 10% of one or more dispersants and additives.

The agglomerated beads are combined with the cementitious material to form a cement-based composition. Cement paste is made by adding water to the cement-based composition. Swimming pool plaster, grouts, concrete and mortar are made by combining water, the cement-based composition, and any desired aggregate, admixtures or additives.

In prior art cement systems, conventional calcined clays of a sufficiently fine particle size cause an increase in water demand over the water demand of ordinary portland cement. The increased water demand is directly correlated to dramatic decreases in early compressive strengths of the prior art cementitious systems containing conventional calcined clays with respect to ordinary portland cement. The apparent increase in water demand can be offset by chemical admixtures called water-reducers or superplasticizers (high-range water reducers). For mortars, the water demand can be correlated to workability, using a flow table apparatus as described in ASTM C230-90. The flow is measured according to the procedure in Section 10 of ASTM C109/109M-95. The number following the ASTM test method number indicates that it is the ASTM test method in effect during that specific year, such as 1995 in the case where 95 follows the ASTM test method.

ASTM C 109/109M-95 quantifies the flowability and the compressive strength of hydraulic cement mortars. The compressive strength is the measured maximum resistance of a specimen to axial compressive loading normally expressed as force per unit cross-sectional area. Although the ASTM test methods are set out specifically, those skilled in the art may be aware of alternative methods which could be used to test for the referenced qualities or results. The only difference being, the results or qualities may be reported in a different manner wherein a conversion system could be used to give comparable results. Consequently, the invention should not be limited by the referenced test methods and the results thereof, but rather only to the claims as set forth below taking into account equivalent testing methods and results.

Examples of this invention are included hereinbelow. Of course, the examples are not intended as limiting this invention as modification of the examples by ordinary expedient will be readily apparent to those of ordinary skill in the art. Unless otherwise indicated in the following examples and elsewhere in the specification and claims, all parts and percentages are by weight, temperatures are in degrees Celsius, pressures are at or near atmospheric.

Two mortar compositions, one composition according to the present invention and the other composition not according to the invention are made and compared. In the first composition (according to the present invention), a cement-based composition of 93% by weight mortar cement and 7% by weight of a spray-dried metakaolin in the form of agglomerated beads is combined with water with a water-to-cement ratio of 0.48. In the second composition (not according to the present invention), a cement-based composition of 93% by weight mortar cement and 7% by weight of conventional metakaolin is combined with water with a water-to-cement ratio of 0.48.

First, the flowability is examined. The results indicate the lower water demand of the composite made in accordance with the present invention. In order to obtain the same flowability or workability, 1.2% by weight of a superplasticizer chemical admixture is added to the first composition while 3.2% by weight of the same superplasticizer chemical admixture is added to the second composition (more superplasticizer chemical admixture is added to the second composition so that the second composition has the same flowability as the first composition). This indicates a reduction in the water demand of the first composition containing spray-dried metakaolin.

Second, the compressive strength over time is examined. Each mortar composition is formed into a 2 inch cube and the compressive strength is tested. The reported compressive strengths represent the average of testing two cubes (for each composition at each testing age). When not under testing, the mortar cubes are stored in lime water. The results are reported in Table 1.

TABLE 1

| Testing Age (days) | Compressive Strength (psi) | |
|---|---|---|
| | Invention | Conventional metakaolin |
| 1 | 3,310 | 1,630 |
| 7 | 7,350 | 5,820 |
| 28 | 8,910 | 6,630 |

In one embodiment, the amount of water combined with the cement-based compositions according to the present invention is about 5% less than that required to obtain the same flowability compared to conventiontional cement-based compositions such as those made with conventional pozzolans including conventional metakaolin (other than water, the amounts of other components, such as optional additives, are the same). In another embodiment, the amount of water combined with the cement-based compositions according to the present invention is about 10% less than that required to obtain the same flowability compared to conventiontional cement-based compositions such as those made with conventional pozzolans including conventional metakaolin (other than water, the amounts of other components, such as optional additives, are the same). In yet another embodiment, the amount of water combined with the cement-based compositions according to the present invention is about 20% less than that required to obtain the same flowability compared to conventiontional cement-based compositions such as those made with conventional pozzolans including conventional metakaolin (other than water, the amounts of other components, such as optional additives, are the same). This is a notable improvement since a lower water demand is associated with an increase in density and an increase in strength.

Conventional cement-based compositions (those made with conventional pozzolans including conventional metakaolin) have a loose bulk density of 15 lbs/ft$^3$ and a tamped bulk density of 28 lbs/ft$^3$. In one embodiment, the loose bulk density of cement-based compositions according to the present invention is at least about 25 lbs/ft$^3$ (according to ASTM D716-86). In another embodiment, the loose bulk density of cement-based compositions according to the present invention is at least about 30 lbs/ft$^3$ (according to ASTM D716-86). In yet another embodiment, the loose bulk density of cement-based compositions according to the present invention is at least about 33 lbs/ft$^3$ (according to ASTM D716-86).

In one embodiment, the tamped bulk density of cement-based compositions according to the present invention is at least about 35 lbs/ft$^3$. In another embodiment, the tamped bulk density of cement-based compositions according to the present invention is at least about 40 lbs/ft$^3$. In yet another embodiment, the tamped bulk density of cement-based compositions according to the present invention is at least about 45 lbs/ft$^3$.

The mortar compositions made in accordance with the present invention not only exhibited superior workability, but also superior compressive strength. It is difficult to simultaneously improve both workability and compressive strength, yet the present invention provides cement-based compositions exhibiting both improved workability and compressive strength. The present invention also provides cement-based compositions having relatively high bulk densities (loose and/or tamped).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A cement composition comprising at least one cementitious material and at least one highly reactive pozzolan, wherein the highly reactive pozzolan comprises spray-dried metakaolin.

2. The cement composition according to claim 1, wherein the spray dried metakaolin is made by heat treating hydrous kaolin, combining the heat treated hydrous kaolin with water forming a slurry of metakaolin, and spray drying the metakaolin to form the spray dried metakaolin.

3. The cement composition according to claim 2, wherein the slurry comprises at least 40% by weight metakaolin.

4. The cement composition according to claim 1, wherein the highly reactive pozzolan further comprises a dispersant.

5. The cement composition according to claim 4, wherein the dispersant comprises at least one of an ammonia-based dispersant, a phosphate-based dispersant, a sulfonate dispersant, a carboxylic acid dispersant and a polymeric dispersant.

6. The cement composition according to claim 1, wherein the highly reactive pozzolan is in the form of agglomerated beads comprising microparticles of metakaolin.

7. The cement composition according to claim 1, comprising from about 50% to about 99.5% of the cementitious material and from about 0.5% to about 50% of the highly reactive pozzolan.

8. A cement composition comprising at least one cementitious material and at least one highly reactive pozzolan, wherein the highly reactive pozzolan is characterized as comprised of agglomerated beads of microparticles, the agglomerated beads having a median diameter of at least about 10 microns and the microparticles having a median diameter of about 5 microns or less.

9. The cement composition according to claim 8, wherein the microparticles have a median diameter of about 0.75 microns or less.

10. The cement composition according to claim 8, wherein the agglomerated beads have a median diameter of at least about 20 microns.

11. The cement composition according to claim 8, wherein the agglomerated beads have a median diameter of at least about 15 microns.

12. The cement composition according to claim 8, wherein the highly reactive pozzolan comprises agglomerated metakaolin.

13. A cement composition comprising at least one cementitious material and at least one highly reactive pozzolan, wherein the highly reactive pozzolan comprises an agglomerated metakaolin and a dispersant.

14. The cement composition according to claim 13, wherein the agglomerated metakaolin comprises spray dried metakaolin.

15. The cement composition according to claim 13, wherein the agglomerated metakaolin comprises a high shear mixed metakaolin.

16. The cement composition according to claim 13, wherein the dispersant comprises at least one of an ammonia-based dispersant, a phosphate-based dispersant, a sulfonate dispersant, a carboxylic acid dispersant and a polymeric dispersant.

17. The cement composition according to claim 13, wherein the dispersant comprises a polyacrylate dispersant.

18. The cement composition according to claim 13, wherein the highly reactive pozzolan comprises from about 0.1% to about 20% by weight of the dispersant.

19. The cement composition according to claim 13, wherein the cementitious material comprises Portland cement.

20. The cement composition according to claim 13, comprising from about 50% to about 99% by weight of the cementitious material and from about 1% to about 50% by weight of the highly reactive pozzolan, the highly reactive pozzolan comprising from about 80% to about 99% of the agglomerated metakaolin and from about 1% to about 20% of the dispersant.

21. The cement composition according to claim 13 having a loose bulk density of at least about 30 lbs/ft$^3$.

22. The cement composition according to claim 13 having a tamped bulk density of at least about 40 lbs/ft$^3$.

* * * * *